US009505168B2

United States Patent
Hinterseer

(10) Patent No.: US 9,505,168 B2
(45) Date of Patent: Nov. 29, 2016

(54) TOOL FOR RF WELDING, ARRANGEMENT OF A CENTRAL ELECTRODE AND USE OF A CENTRAL ELECTRODE

(75) Inventor: Heinz Hinterseer, Freilassing (DE)

(73) Assignee: KIEFEL GMBH, Freilassing (DE)

( * ) Notice: Subject to any disclaimer, the term of this patent is extended or adjusted under 35 U.S.C. 154(b) by 2456 days.

(21) Appl. No.: 14/117,164

(22) PCT Filed: Jun. 5, 2007

(86) PCT No.: PCT/DE2007/000998
§ 371 (c)(1),
(2), (4) Date: Nov. 12, 2013

(87) PCT Pub. No.: WO2007/140760
PCT Pub. Date: Dec. 13, 2007

(65) Prior Publication Data
US 2014/0138024 A1    May 22, 2014

(30) Foreign Application Priority Data
Jun. 8, 2006 (DE) .................. 10 2006 026 697

(51) Int. Cl.
B29C 65/04 (2006.01)
B29C 65/00 (2006.01)
B29L 31/00 (2006.01)

(52) U.S. Cl.
CPC .......... *B29C 65/04* (2013.01); *B29C 66/1122* (2013.01); *B29C 66/232* (2013.01); *B29C 66/3452* (2013.01); *B29C 66/433* (2013.01); *B29C 66/53262* (2013.01); *B29C 66/63* (2013.01); *B29C 66/69* (2013.01); *B29C 66/81431* (2013.01); *B29C 66/81461* (2013.01); *B29C 66/81463* (2013.01); *B29C 66/81871* (2013.01); *B29C 66/81423* (2013.01); *B29C 66/8322* (2013.01); *B29C 66/83221* (2013.01); *B29L 2031/7148* (2013.01)

(58) Field of Classification Search
CPC ... B29C 65/04; B29C 65/00; B20C 66/3452; B20C 66/80; B20C 66/81431; B20C 66/53262; B20C 66/1122; B20C 66/43
See application file for complete search history.

(56) References Cited

U.S. PATENT DOCUMENTS 2,764,660 A * 9/1956 Grenoble ............... H05B 6/362
219/234
4,900,389 A * 2/1990 Schnell ................. A61F 5/4405
156/273.7

FOREIGN PATENT DOCUMENTS

| GB | 2 434 337 A | 7/2007 |
|---|---|---|
| JP | 62 034563 A | 2/1987 |
| JP | 63 290568 A | 11/1988 |
| JP | H08 117318 | 5/1996 |

(Continued)

OTHER PUBLICATIONS

Machine Translation of JP2001-269389A.*
Abele: "Kunststoff-Fügeverfahren" 1977, Carl Hanser Verlag, Munich XP002462978; figure 243 (b,c); pp. 188-191.
International Search Report issued by the European Patent Office in International Application PCT/DE2007/000998.

(Continued)

*Primary Examiner* — Daniel McNally
(74) *Attorney, Agent, or Firm* — Henry M. Feiereisen LLC

(57) ABSTRACT

In a process of welding pieces of tubing into films with a central electrode the central electrode is divided to facilitate the welding in a single process. In the case of tools with or without a central electrode, electrode lamellae lying next to one another have a free visual connection between edges lying towards the insert piece to obtain a tight welded joint.

8 Claims, 3 Drawing Sheets

(56) References Cited

FOREIGN PATENT DOCUMENTS

| | | | | |
|---|---|---|---|---|
| JP | H11 235376 | 8/1999 | | |
| JP | 2000 237280 | 9/2000 | | |
| JP | 2001269389 A | * 10/2001 | ................ | A61J 1/00 |

OTHER PUBLICATIONS

European Search Report issued on Jun. 20, 2016 with respect to counterpart European patent application EP 16 00 0171.
Translation of European Search Report issued on Jun. 20, 2016 with respect to counterpart European patent application EP 16 00 0171.

* cited by examiner

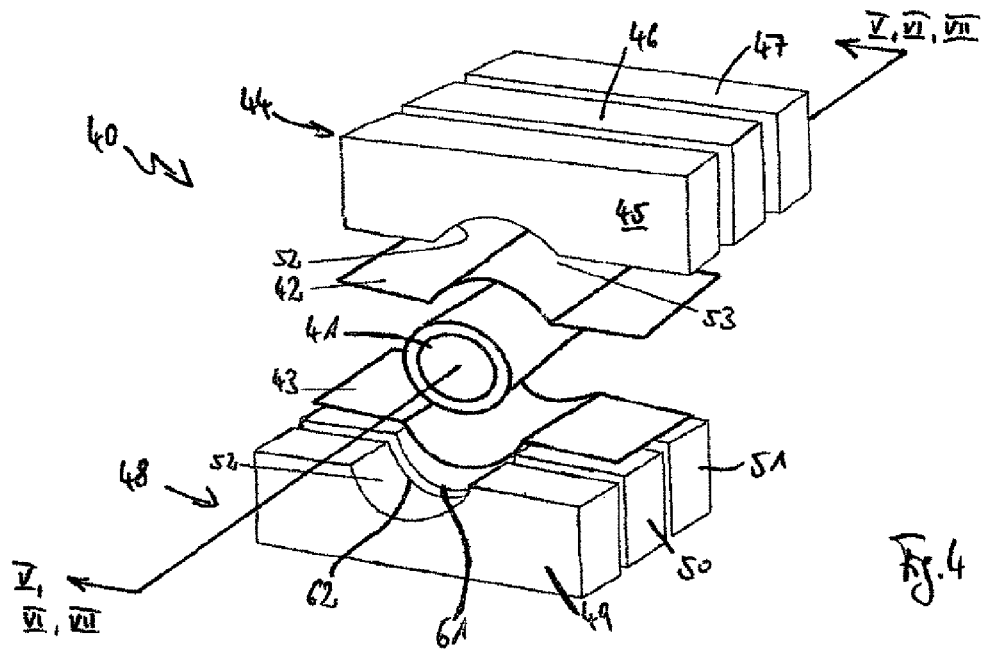
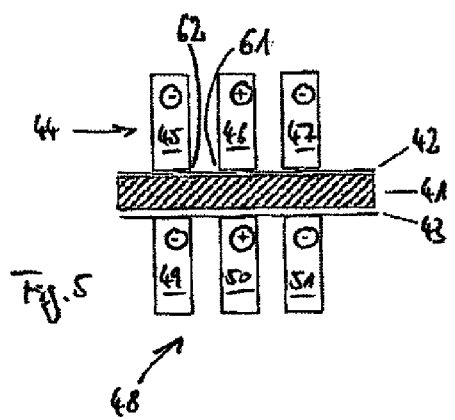
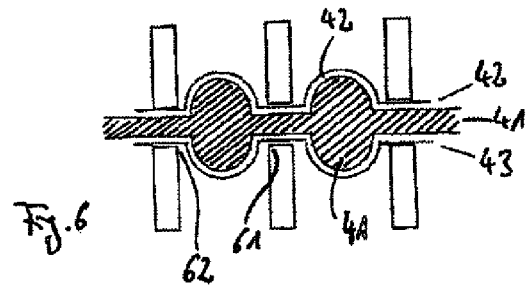
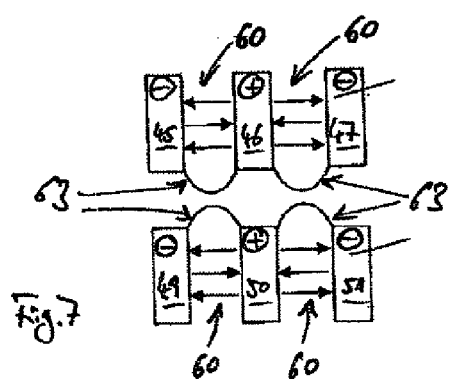

TOOL FOR RF WELDING, ARRANGEMENT OF A CENTRAL ELECTRODE AND USE OF A CENTRAL ELECTRODE

CROSS-REFERENCES TO RELATED APPLICATIONS

This application is the U.S. National Stage of International Application No. PCT/DE2007/000998, filed Jun. 5, 2007, which designated the United States and has been published as International Publication No. WO 2007/140760 and which claims the priority of German Patent Application, Ser. No. 10 2006 026 697.8, filed Jun. 8, 2006, pursuant to 35 U.S.C. 19(a)-(d).

BACKGROUND OF THE INVENTION

The invention relates to a tool for RF welding of an insert part with two films to a bag, the arrangement of a central electrode on a tool and the use of a central electrode in an RF welding method.

High-frequency or radio-frequency welding is a welding technique in which radio-frequency energy is introduced into the region which is to be welded. The resulting welded joint is very stable. In particular, it can be watertight.

RF welding methods are often used in order to weld together films to an airtight or watertight bag or tube. In medical product technology this method is used to manufacture pouches into which a tubular opening is inserted. For this purpose, a plastic tube is normally welded to two films and the two films are welded together.

Abele, Plastic jointing methods, Carl Hanser Verlag Munich, 1977, shows multiple methods of this kind. Thus an electrode arrangement is shown in FIG. 243b there, in which the electrode on the lower tool is constructed from a single piece, while the electrode on the upper tool is constructed from three pieces. A central electrode is additionally present. With this tool, in one welding process a welded joint can be created both between tubes to be welded in and two films as well as between the two films themselves.

Another known technique is to perform a weld between a tube and two films in two consecutive process steps: firstly the central electrode has RF energy applied to it, while the integral upper tool and the integral lower tool are each connected to ground. This generates a welded joint along the perimeter of the tube. In the second step a welded joint is created between the films, often along the perimeter of a bag. To achieve this the upper tool has a different polarity applied to it than the lower tool, while the central electrode is connected to neutral. The resulting welded joint between the two films is formed either immediately along the entire perimeter of the bag, or firstly in a small region at the side of the welded-in tube, and then with a bag perimeter welding tool along the perimeter of the bag. In the latter case the two weld regions overlap with respect to the films, in order to create a tight joint.

In general, when using RF welding methods for welding an object into two films it is necessary to distinguish between a small tube that is to be welded in between two films, and longer objects or solid profiled objects that are to be welded in.

When a short tube is to be welded in between two films, a central electrode is often introduced into the tube to form the weld. When a long tube is to be welded in, into which a central electrode cannot be introduced for practical reasons, or when a solid profiled object such as, for example, a cable is to be welded in, tools without central electrodes are used.

In the case of welding methods with a central electrode, the welding process is carried out both via primary fields between the electrodes and via leakage fields, which are formed at the edges of the electrodes. In the case of welding methods without central electrodes on the other hand the welding processes take place with the cable or similar objects for the most part only via leakage fields.

The last cited methods, namely welding in of cables with RF welding methods, is described by Abele in a sequel volume on pages 469, 470.

SUMMARY OF THE INVENTION

The problem addressed by the invention is to provide improvements with regard to RF welding methods.

According to a first aspect of the invention this problem is solved by a tool for RF welding of an insert part with two films to a bag, having an upper tool, a lower tool and a central electrode, wherein the central electrode comprises multiple electrodes.

The first aspect of the invention therefore relates to RF welding methods in which in particular short tubes are welded to films. This can be demonstrated by the fact that a central electrode is used. The welded joint is therefore effected via primary fields and leakage fields.

While a central electrode was conventionally constructed as an integral electrode, it is now proposed to introduce multiple different electrodes into the tube as central electrodes. The different electrodes are to be connected to the tool in such a way that they can be differently polarised.

This allows the advantage to be obtained that with only one welding process a welded joint with respect to the entire perimeter of the tube is formed with the films, and at the same time between the two films themselves. if for example the upper tool has RF applied to it, but one electrode of the central electrode device, which is directed towards the upper tool, is earthed, then a primary field is set up between the upper tool and that electrode of the central electrode device, such that a welded joint is formed along the upper half of the circumference of the tube. If at the same time the lower tool is connected to earth, a further primary field is set up between the upper tool and the lower tool. This causes the two films to be welded together, specifically—depending on the size and configuration of the tool—either only in the region directly adjacent to the tube or along the entire perimeter of the bag. If at the same time an electrode of the central electrode device directed towards the lower tool has RF applied to it, a primary field is also set up at the perimeter of the tube directed towards the lower tool, such that a tight welded joint is also obtained there.

It is evident that the potentials can also be arranged the other way around.

According to the prior art, at least one switching over of the potentials had to be made regardless of whether the perimeter of the bag is being welded with the same tool as the tube. The invention makes this unnecessary. It is now possible to simultaneously weld the tube to the films at its perimeter and the films to one another, and specifically, regardless of whether the films are to be welded together firstly only in the surrounding region of the tube and then with a bag perimeter tool, or alternatively along the entire perimeter of the bag at the same time.

According to a second aspect of the invention, the problem addressed is solved by a tool for RF welding of an insert part with two films to a bag, having an upper tool, a lower tool and a central electrode, wherein said central electrode comprises an electrical partition.

It is clear that a central electrode with an electrical partition can be directly used in such a way that near to the electrical partition differing polarities are generated within the central electrode. This makes a central electrode with electrical partition amenable to a method such as that described above.

According to a third aspect of the invention, the problem addressed is solved by a tool for RF welding of a single part with two films to a bag, having an upper tool, a lower tool and a central electrode, wherein four electrodes are provided which enable a tight welded joint to be formed between the films and the insert part in a single welding process.

While Abele, 1977, provides five electrodes in FIG. 243b given there, in FIG. 243a he provides only three electrodes. The invention by contrast has recognised that the arrangement of precisely four electrodes enables the immediate formation of a tight welded joint in one process.

According to a fourth aspect of the invention, the problem addressed is solved by a tool for RF welding of a insert part with two films to a bag, having an upper tool, a lower tool and a central electrode, wherein the tool is equipped for the purpose of generating a symmetrical field relative to a separation plane with symmetrical polarity, wherein by means of the field a tight welded joint is obtained between the films and with the insert part in one welding process.

It is true that Abele, 1977, in his FIG. 243a, provides a symmetrical field relative to the plane between the two films. However, he clearly states that a tight welded joint between tube and films cannot be guaranteed in this way. In FIG. 243b by contrast a tight welded joint is certainly possible at the tube, but the primary and leakage fields are not symmetrical. This can already be seen from the fact that the upper tool is electrically constructed in a different way than the lower tool. It is obvious that with a symmetrical structure a more constant welded joint is obtained.

In FIG. 243c while symmetrical fields are certainly produced and a tight welded joint obtained, there are however two welding processes necessary.

According to a fifth aspect of the invention, the problem addressed is solved by a tool for RF welding an insert part with two films to a bag, having an upper tool, a lower tool and a central electrode, wherein electrodes of the tool are arranged so as to generate three primary fields, one of which welds the two films together, while the other two weld the insert part with the films, specifically at different surface regions of the insert part.

It is understood that the features of the five aspects of the invention described above are both independent of one another and are advantageous in any desired combination.

The central electrode device preferably comprises two central electrodes, which the tool is arranged to polarise in different ways.

Two electrodes of the central electrode device are preferably electrically isolated from each other by means of a separator. Such a separator preferably also comprises a non-conducting material, for example a plastic. The separator can for example divide the central electrode into two mutually symmetrically formed central electrode halves, especially if an insert part is to be welded in symmetrically between the two films.

The central electrode is preferably constructed symmetrically in relation to a separation plane between the two films, that is, in particular both with respect to different parts of the central electrode as well as to any electrical separators.

A particularly favourable central electrode that is also simple to manufacture from a production engineering point of view consists of a divided rod, wherein the separator is arranged between the individual parts of the rod.

An alternative configuration can consist of the central electrode being assembled from a tube divided longitudinally with an inner filling of insulating material, wherein the separator, consisting of insulating material, also isolates the opposite facing walls of the tube from one another.

A further configuration is conceivable in which the central electrode consists of a bar made of non-polarised material, on which electrode sub-regions are formed by means of galvanically conducting layers, which are isolated from one another by a non-polarised isolating layer at their opposite facing, longitudinally extending intersection points. This isolating layer can be for example an insulating paint.

According to a sixth aspect of the invention, the problem addressed is solved by the arrangement of a central electrode on a tool in one of the above described ways together with a bag perimeter electrode.

It should be expressly pointed out that a welding tool with a central electrode as described above can not only be used for performing the welding process of either the tube alone or of the tube and the films in the region surrounding the tube. But rather, according to the sixth aspect of the invention, on the same tool as the advantageous central electrode previously described, it is possible to install a bag perimeter electrode.

It is one thing to use a central electrode with a multi-part structure for welding the tube into the neck of the bag. It is technically and commercially much more interesting however to provide the bag perimeter electrodes on the same tool.

RF-welds of such bags can then be performed in just one welding press, in a single welding period for the tube and bag perimeter, and in particular, given an appropriate configuration, with just a single generator and divided central electrode. The central electrode in this case is supplied with a polarity matching that of the bag perimeter welding tool.

According to a seventh aspect of the invention, the problem addressed is solved by the use of a central electrode constructed as described above together with a bag perimeter electrode on two separate tools for a machine or on a single tool for tightly welding the insert piece and the perimeter of a bag.

According to an eighth aspect of the invention, the problem addressed is solved by the use of a central electrode constructed as described above in an RF welding process, in which a welded joint is formed between the films and with the insert part, and also along a bag perimeter, in particular in one process and/or without changing the tool.

According to a ninth aspect of the invention, the problem addressed is solved by the use of a central electrode constructed as described above in an RF welding process, in which a welded joint is formed in the region of the insert piece in a first step, and then in a second step a welded joint is formed on a bag perimeter.

It has already been explained above that it is not always the case that a central electrode can be used. A central electrode cannot be used in particular when although it is the case that a tube is to be welded into two films, this tube is so long that a central electrode cannot be inserted. Central electrodes cannot moreover be used, when the object to be inserted into the two films has a free cross-section that is too small, or even does not have one at all. This is the case with a cable, for example.

Since it is not possible to position a central electrode, that is a central electrode of any description, inside the insert piece, strict technical requirements are placed on the solution of the problem of achieving a tight welded joint along the perimeter of the insert piece.

This is achieved by the fact that electrodes are attached to the perimeter surface of the insert piece, wherein a field is generated between the electrodes essentially in the longitudinal direction of the insert piece. Edge regions of these electrodes are directly in contact with the insert piece, and are preferably pressed into the surface thereof by applying pressure.

While the electrodes are activated the primary field extends from the neighbourhood of the insert piece. However at the edges of the electrodes—and therefore at the perimeter surface of the insert piece—a leakage field is produced, which causes a heating of the material. Since the electrodes are held by force against the surface, these penetrate slightly into the heated surface of the insert piece. A consequence of this is that the surface between the electrodes intrudes slightly into the primary field. In this way, a welded joint is obtained by means of the primary field.

According to a tenth aspect of the invention, this effect is achieved relative to the prior art in a tool for RF welding of an insert part with two films, having an upper tool and a lower tool, which each comprise a plurality of electrode lamellae that are alternately polarised in a longitudinal direction of the insert part and symmetrically placed perpendicular to this direction, by the fact that an open connection exists between edges of adjacent electrode lamellae of different polarity oriented towards the insert piece.

In conventional methods and tools of this kind, insulating layers were arranged between the lamellae. The purpose of these was to prevent an unwanted flashover of the electrical voltage.

The tenth aspect of the invention described is based on the surprising discovery that under suitable setting of voltage, spacing of the electrodes and thickness of the electrodes, a flashover certainly does not take place, but nevertheless a sufficiently strong field is generated to carry out the welding process.

To achieve this, insulation can be placed between the electrode lamellae as before. Directly on the edges which are intended to be in contact with the workpiece, or at least on a part of these edges, a free visual connection should exist between adjacent electrode lamellae.

The electrode lamellae of the upper and/or the lower tool are preferably spaced slightly apart, but without additional insulation.

The invention is described below in further detail with the aid of three embodiments and with reference to the drawing. Functionally identical elements in the various figures can have identical reference numbers.

BRIEF DESCRIPTION OF THE DRAWING

The drawings show—in each case schematically—

DETAILED DESCRIPTION OF PREFERRED EMBODIMENTS

Figure 1:
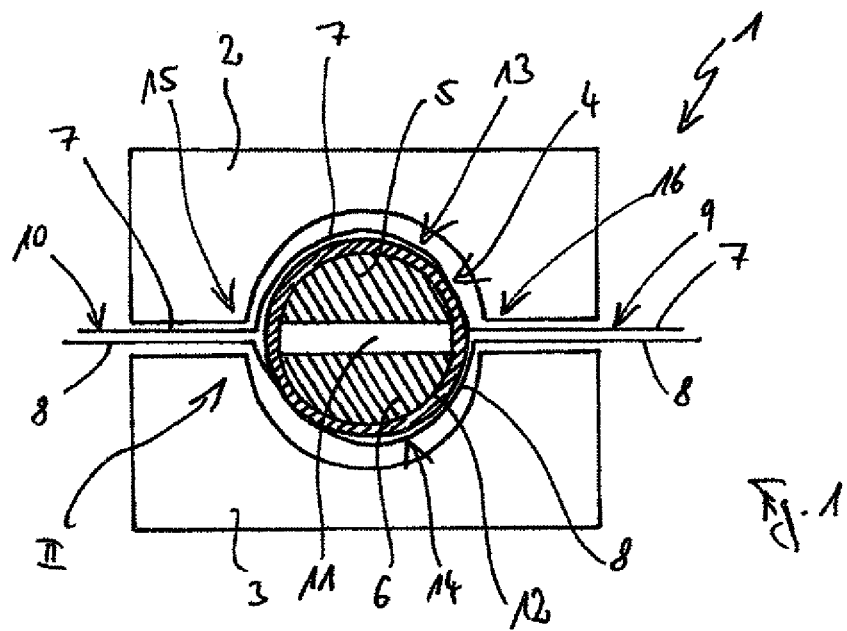
FIG. 1 a section through a welding tool with a divided central electrode and two inserted, not yet welded films, FIG. 2 a detail taken from FIG. 1, FIG. 3 a plan view of a tool with a bag perimeter welding electrode, FIG. 4 an exploded spatial view of a welding tool for a cable, with multiple electrode lamellae and with no central electrode, FIG. 5 the tool of FIG. 4 in a side view along the line labelled V-V, FIG. 6 the tool of FIGS. 4 and 5 after a preliminary heating process and FIG. 7 the structure of the RF-field around the tool according to FIGS. 4 to 6.
Figure 2:
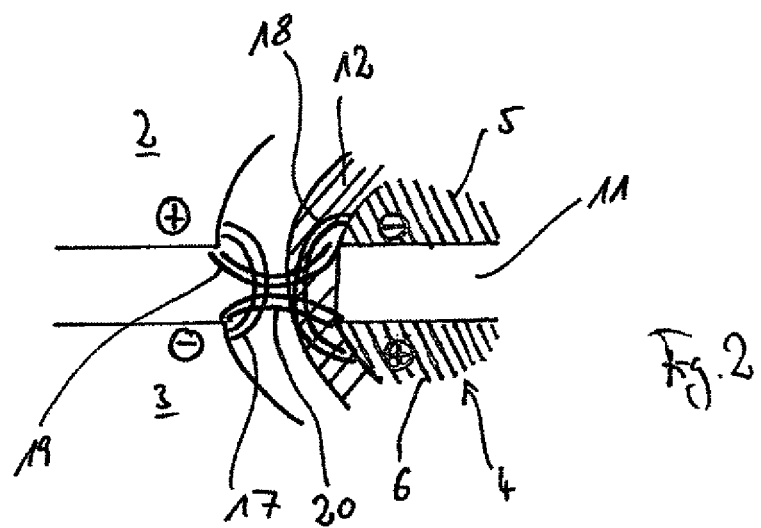

The welding tool 1 in FIGS. 1 and 2 consists essentially of an upper tool 2 and a lower tool 3. These are constructed in the form of an integral electrode respectively.

Also part of the tool 1 is a central electrode 4. This consists of an upper electrode 5 and a lower electrode 6. These two electrodes are symmetrical in construction with respect to a plane defined between an upper film 7 and a lower film 8 through their surface regions 9, 10.

The upper electrode 5 and the lower electrode 6 of the central electrode 4 together with a non-conducting plastic insulator 11 form a complete circular cross-section.

It is understood that other cross-sections would also be advantageous, for example in the form of an oval, a polygon, a rectangle or a square.

A piece of tubing 12 is placed over the central electrode 4. The piece of tubing 12 is to be tightly welded into the two films 7, 8 in the tool 1.

Since the central electrode 4 with the upper electrode 5 and the lower electrode 6 comprises two electrically separated electrodes, these con be differently polarised from the tool 1. Altogether therefore, four electrodes are present, which facilitate a tight welding of the upper film 7 to the lower film 8, and at the same time between the films 7, 8 and the tube 12 in a single welding process.

Since the tool 1 both with regard to the upper tool 2 and the lower tool 3 as well as with regard to the two electrodes 5, 6 of the central electrode 4, is constructed symmetrically relative to a separation plane between the film 7 and the lower film 8, during the welding process a symmetrical structure is set up with respect to both the RF primary field and the RF leakage field. The welded joint is therefore formed homogeneously.

In the operation of the tool 1 the upper tool 2 for example receives a RF polarity. The upper electrode 5 of the central electrode 4 receives an earth polarity. Due to this a primary field is set up between the upper tool 2 and the upper electrode 5 of the central electrode 4, so that at an upper tube perimeter region 13 a primary field welded joint is formed between the tube 12 and the upper film 7.

At the same time an earth polarity is assigned to the lower tool 3. Due to this a second, simultaneous primary field is set up between the upper tool 2 and the lower tool 3, which passes through the flat regions 9, 10 of the upper film 7 and the lower film 8. This causes the two films 7, 8 to be securely welded together in the flat regions 9, 10, that is, adjacent to the tube 12.

The lower electrode 6 of the central electrode 4 receives an RF polarity at the same time. This causes—in a symmetrical manner to the upper half in the tool 1—a simultaneous primary field welded joint between the tube 12 on its lower tube perimeter 14 with the lower film 8.

In only a single welding press therefore, namely the tool 1, a tight and securely reproducible welded joint of the region shown in FIG. 1 can be formed in just one welding cycle, both for the tube 12 as well as between the films 7, 8 and with only a single generator (not illustrated).

In transition regions 15, 16 in particular, between the flat regions 9, 10 of the two films 7, 8 and the perimeter region 13, 14 of the tube 12, a very intensive welded joint is formed, since in addition to the three primary fields between the differently polarised electrodes another four leakage fields 17, 18, 19, 20 are formed there, which even overlap precisely in the transition regions 15, 16 and there lead to a particularly intensive welded joint.

Figure 3:
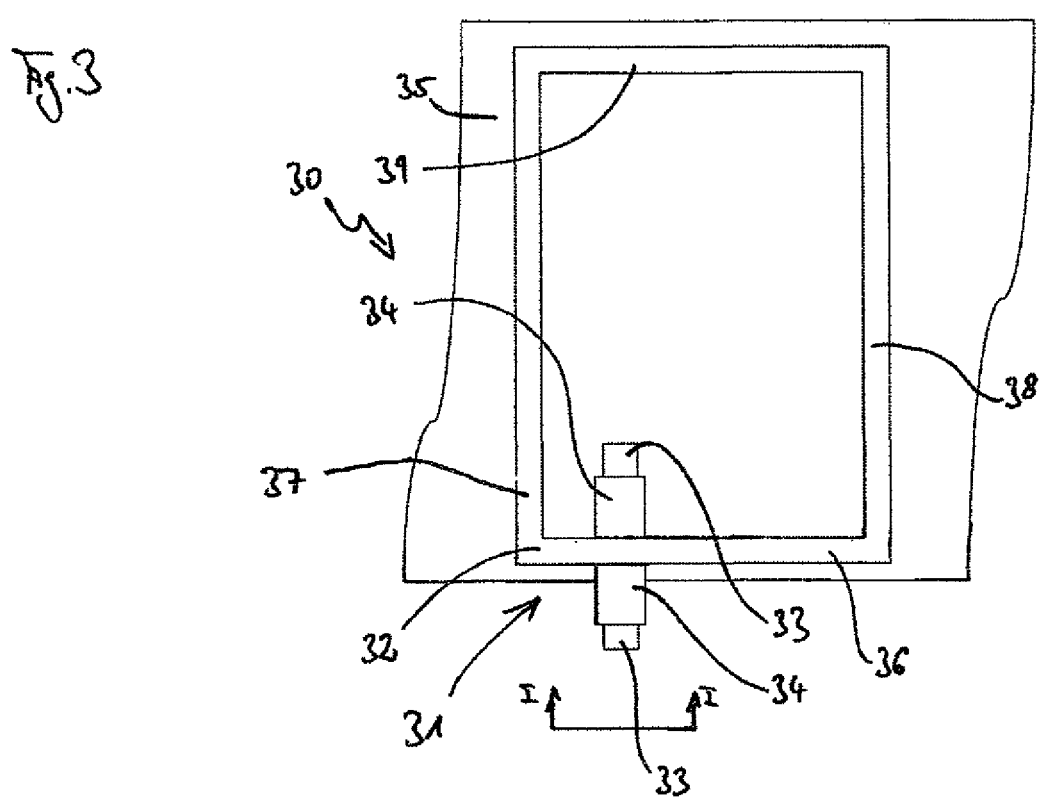

The tool 30 in FIG. 3 in a region 31 of the bag neck consists of a frame-shaped upper tool 32, an identically shaped lower tool (hidden by the upper tool 32) and a central electrode 33 with two electrodes, one of which is aligned towards the upper tool 32 and one towards the lower tool.

Between the upper tool 32 and the lower tool a piece of tubing 34 is arranged. This is to be tightly joined by the tool 30 in an RF welding process to a lower film 35 and an upper film (not illustrated).

For this purpose the upper film and the lower film 35 are positioned such that they enclose the tubing piece 34. The upper tool 32 lies on the upper film. The lower tool lies under the lower film 35.

Unlike the tool 1, the upper tool 32 and the lower tool of the tool 30 extend far beyond the bag neck region 31 next to the tubing piece 34. In the exemplary embodiment illustrated in FIG. 3 a front electrode leg 36 is pulled over an entire width of a bag that is to be produced. To this are connected two longitudinal legs 37, 38 of the upper tool 32 and the lower tool. These finally turn into a leg 39 to form a closed base side of the bag.

The upper tool 32 and the lower tool therefore serve not only as tube perimeter electrodes around the tube piece 34, but simultaneously as bag perimeter electrodes for welding the entire bag. This is a particularly advantageous tool.

After the welding process the bag is hermetically sealed, with the exception of the opening through the tubing piece 34 however, as soon as the central electrode 33 is removed from the piece of tubing 34 after the welding process.

It should be expressly pointed out that an alternative advantageous construction, not shown here, can consist in providing multiple electrically separated central electrodes on one tool. In this manner, bags with for example two tubular openings can be produced. This can also be carried out with only one generator.

Preferably, one section of a central electrode, which should not be placed in a piece of tubing while the welding process is running, is surrounded by an insulator.

In a detailed construction example, a film with a thickness of around 350 µm can be used in order to form the bag, for example. The piece of tubing can consist of PVC and have a diameter of 6×8 mm. For the central electrode in this case the suggested material would be VA with a diameter of 6 mm. As a separator the material PTFE and/or PP is very suitable, for example with a thickness of 600 µm.

With these initial figures the bag closure region for example, that is film to film, can have a welded end thickness of around 600 µm. The radial thickness of the tubing piece with the film welded on to it can have an end thickness of around 1000 µm, for example.

In the primary field between the two films, that is directly from the upper tool to the lower tool, a voltage of for example around 1250 V can be applied, in the perimeter region around the tubing piece voltage of for example around 1500 V.

The higher voltage at the central electrode can be easily obtained by provision of for example 2 to 3 windings.

As a constructional configuration for an electrically separated central electrode, one possibility is a sawn-through VA-tube which is cast with a non-polarised insulator.

Alternatively a ceramic or non-polarised rod with a partial metallisation is possible. Goldgalvano for example could be considered for this.

It has already been mentioned above that pure surface welding methods in RF technology can be used for joining an insert part and two films. The tool 40 in FIGS. 4 to 7 is such a tool.

In the exemplary embodiment shown a cable piece 41 is to be welded in between an upper film 42 and a lower film 43.

On an upper tool 44 a first upper electrode 45, a second upper electrode 46 and a third upper electrode 47 are located adjacent to one another. On a lower tool 48 a first lower electrode 49, a second lower electrode 50 and a third lower electrode 51 are located at the same axial height.

The electrodes 45, 46, 47, 49, 50, 51 are provided with recesses 52 for retaining the cable 41 in a central region. As a consequence of this in operation they can be pressed under pressure flat against the surface of the cable 41, the films 42, 43 being directly pressed in between them in semi-cylindrical regions 53.

Since no central electrode can be arranged in the cable 41, the welding cannot take process directly in the primary field of the electrodes. The welding process proceeds as follows:

The first and third electrodes 45, 47, 49, 51 respectively receive earth polarity, while the second electrodes 46, 50 respectively have RF applied to them.

This is illustrated in the initial situation in FIG. 5.

While primary fields 60 are formed between the first and second electrodes and between the second and third electrodes, leakage fields 63 arise between edges 61, 62 (numbered by way of example) of the electrodes.

In the leakage fields 63 the workpiece is pre-plasticised. The RF field structure as shown in FIG. 7 remains throughout the entire welding process. Due to the pre-plasticisation the surfaces of both the films 42, 43 and the cable 41 become soft, such that—also as a result of the mechanical pressure due to the electrodes in the upper tool 44 and in the lower tool 48—the electrodes 45, 46, 47, 49, 50, 51 are pressed slightly into the surface of the workpiece. This is shown exaggerated in FIG. 6.

Due to the fact that the electrode edges are now pressed into the surface to be welded, the substance of the material to be welded moves in between the electrodes into the primary field 60. The material moulded in the preliminary welding cycle with the leakage field 63 can now be welded in the primary field 60.

it should be noted that the cable 41 and the films 42, 43 are not shown in FIG. 7 for the sake of better clarity, but in practice they are of course present there.

In other words, multiple electrode plates each with alternating polarity are arranged in the longitudinal direction of the insert piece, wherein electrode plates lying opposite one another have the same polarity. The individual electrode plates of the electrodes can be matched to the contours of the insert piece at the places where the insert piece is to be welded to the film. In the case of these electrodes the primary field is formed between the electrode plates of the same electrode half, while the leakage field is formed in the shape of an arc between the edges of neighbouring electrode plates. Since the individual electrode plates are inherently constructed from one piece, a particularly simple structure is obtained. This electrode is suitable not only for welding processes without an additional central electrode, but an additional central electrode can also be present.

Common to all the illustrated embodiment variants is the fact that electrodes lying opposite one another and separated from one another by the films have an arrangement in which, relative to the separation plane formed by the contact surface of the films, both the primary field as well as the leakage field are symmetrical. This is made possible by a symmetrical construction of the electrodes, which is also possible without a complicated structure of each individual electrode on both sides of the separation plane.

For the sake of completeness it should also be mentioned that the inner and outer diameter of an insert piece can be different. Thus an injection moulded part with, for example, a boat-shaped outer cross-section and circular or oval inner cross-section can be used.

The central electrode can also have a cross-section deviating from the circular, so for example with an outer circumference in the shape of an oval, a rectangle or a polygon.

The invention claimed is:

1. A tool for RF welding of a tube to two films forming a bag, with each film having a central region for surrounding the tube from above and from below, respectively, and two flat regions extending at both sides from each central region in opposite directions, said tool comprising an upper tool, a lower tool, and a central electrode disposed between the upper and lower tools and including multiple electrodes, wherein the central electrode is constructed of a divided rod to define the multiple electrodes, and a separator arranged between the multiple electrodes, wherein each of the upper and lower tools has a concave surface bounding a central cavity and two flat side surfaces extending from the central cavity in opposite directions, and wherein the multiple electrodes include an upper electrode received in the central cavity of the upper tool and having an upper convex surface facing the concave surface of the upper tool and a lower flat surface and a lower electrode received in the central cavity of the lower tool and having a lower convex surface facing the concave surface of the lower tool and an upper flat surface facing the lower flat surface of the upper electrode, so that the tube and the central regions of the films are receivable in the central cavities of the upper and lower tools below the concave surface of the upper tool and above the convex surface of the upper electrode and above the concave surface of the lower tool and below the convex surface of the lower electrode, while the flat regions of the films are receivable between the side surfaces of the upper and lower tools.

2. The tool of claim 1, wherein the central electrode includes two of said electrodes to polarize the tool in two different ways.

3. The tool of claim 1, wherein the separator electrically isolates the electrodes from each other.

4. The tool of claim 1, wherein the central electrode is constructed symmetrically with respect to a separation plane.

5. The tool of claim 1, further comprising a further electrode configured for arrangement on at least one of a bag perimeter, a region of a bag neck, and a bag base.

6. A method for RF welding of a tube to two films forming a bag, comprising the steps of providing each film with a central region for surrounding the tube from above and from below, respectively, and with two flat regions extending at both sides from each central region in opposite directions; using a tool having an upper tool, a lower tool, and a central electrode disposed between the upper and lower tools and including multiple electrodes; constructing the central electrode of a divided rod to define the multiple electrodes, and a separator arranged between the multiple electrodes; forming in each of the upper and lower tools a concave surface and a central cavity and two flat side surfaces extending from the central cavity in opposite directions; including in the multiple electrodes an upper electrode received in the central cavity of the upper tool and having an upper convex surface facing the concave surface of the upper tool and a lower flat surface and a lower electrode received in the central cavity of the lower tool and having a lower convex surface facing the concave surface of the lower tool and an upper flat surface facing the lower flat surface of the upper electrode, so that the tube and the central regions of the films are received in the central cavities of the upper and lower tools below the concave surface of the upper tool and above the convex surface of the upper electrode and above the convex surface of the lower tool and below the convex surface of the lower electrode, while the flat regions of the films are received between the side surfaces of the upper and lower tools.

7. The method of claim 6, further comprising forming a welded joint between the films and with the tube, and along a bag perimeter.

8. The method of claim 6, wherein welding is realized by first step a welding joint is formed on a region of the tube, and by a second step in which a welded joint is formed on a bag perimeter.

* * * * *